US009880885B2

(12) United States Patent
Sundararajan et al.

(10) Patent No.: US 9,880,885 B2
(45) Date of Patent: Jan. 30, 2018

(54) METHOD AND SYSTEM TO REBALANCE CONSTRAINED SERVICES IN A CLOUD USING A GENETIC ALGORITHM

(71) Applicant: Telefonaktiebolaget L M Ericsson (publ), Stockholm (SE)

(72) Inventors: Priya Krishnan Sundararajan, Mountain View, CA (US); Eugen Feller, San Francisco, CA (US); Julien Forgeat, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 292 days.

(21) Appl. No.: 14/689,934

(22) Filed: Apr. 17, 2015

(65) Prior Publication Data
US 2016/0226789 A1 Aug. 4, 2016

Related U.S. Application Data

(60) Provisional application No. 62/112,152, filed on Feb. 4, 2015.

(51) Int. Cl.
*G06F 9/50* (2006.01)
*H04L 29/08* (2006.01)

(52) U.S. Cl.
CPC ........ *G06F 9/5083* (2013.01); *H04L 67/1008* (2013.01)

(58) Field of Classification Search
CPC ............................ G06F 9/5083; H04L 67/1008
USPC ....................................................... 709/226
See application file for complete search history.

(56) References Cited

U.S. PATENT DOCUMENTS

| 2009/0070771 A1* | 3/2009 | Yuyitung | G06Q 10/06 718/105 |
| 2011/0179176 A1* | 7/2011 | Ravichandran | G06Q 10/06 709/226 |

OTHER PUBLICATIONS

D. Espling et al., "Modeling and Placement of Cloud Services with Internal Structure," 2014, 11 pages, IEEE Transactions on Cloud Computing.

(Continued)

*Primary Examiner* — David Lazaro
*Assistant Examiner* — Zia Khurshid
(74) *Attorney, Agent, or Firm* — Patent Portfolio Builders, PLLC

(57) ABSTRACT

A method in a server end station is described. The method includes performing an iteration of a rebalancing computation by selecting a set of one or more service sets for rebalancing, wherein the selecting the set of one or more service sets is based on service set constraints and host constraints; generating candidate solutions, wherein each candidate solution includes a randomized one-to-one mapping of each of the service sets to one of the hosts; performing one or more crossover operations on the candidate solutions; performing one or more mutation operations on the additional candidate solutions; selecting as a solution one of the candidate solutions that has a best fitness score, wherein a fitness score for a candidate solution is calculated based on the distribution of resources resulting from and number of migrations needed for the candidate solution; and repeating the iteration of the rebalancing computation an additional number of times.

24 Claims, 10 Drawing Sheets

(56) References Cited

OTHER PUBLICATIONS

Jinhua Hu et al., "A Scheduling Strategy on Load Balancing of Virtual Machine Resources in Cloud Computing Environment," Dec. 2010, pp. 89-96, 2010 3rd International Symposium on Parallel Architectures, Algorithms and Programming (PAAP).

Y. Kessaci et al., "A Pareto-based GA for Scheduling HPC Applications on Distributed Cloud Infrastructures," Jul. 2011, pp. 456-462, 2011 International Conference on High Performance Computing and Simulation (HPCS).

L. Larsson et al., "Scheduling and Monitoring of Internally Structured Services in Cloud Federations," Jun. 2011, pp. 173-178, 2011 IEEE Symposium on Computers and Communications (ISCC).

R. Lee et al., "Load-Balancing Tactics in Cloud," Oct. 2011, pp. 447-454, 2011 International Conference on Cyber-Enabled Distributed Computing and Knowledge Discovery (CyberC), IEEE.

"A Constrained Genetic Algorithm for Rebalancing of Services in Cloud Data Centers," Woodstock '97, El Paso, TX USA; copyright 2015 ACM TBA; 7pgs.

B. Radojevic et al., "Analysis of Issues with Load Balancing Algorithms in Hosted (Cloud) Environments," May 2011, pp. 416-420, 2011 Proceedings of the 34th International Convention in MIPRO.

Xiaona Ren, et al., "A Dynamic Load Balancing Strategy for Cloud Computing Platform Based on Exponential Smoothing Forecast," Sep. 2011, pp. 220-224, 2011 IEEE International Conference on in Cloud Computing and Intelligence Systems (CCIS).

Shu-Ching Wang, et al., "Towards a Load Balancing in a Three-level Cloud Computing Network," Jul. 2010, pp. 108-113, 2010 3rd IEEE International Conference on Computer Science and Information Technology (ICCSIT), vol. 1.

Kai Zhu et al., "Hybrid Genetic Algorithm for Cloud Computing Applications," Dec. 2011, pp. 182-187, 2011 IEEE Asia-Pacific Services Computing Conference (APSCC).

* cited by examiner $$s_{rj} = \begin{cases} 1 & Acons_{s_r,k_j} = true \quad \longleftarrow 202 \\ & \text{and the service } s_r \text{ is placed in service set } k_j \\ 0 & Acons_{s_r,k_j} = false \quad \longleftarrow 204 \\ & \text{and the service } s_r \text{ is not placed in service set } k_j \end{cases} \quad (1)$$

$$k_{ij} = \begin{cases} 0 & AAcons_{k_j,h_i} = true \quad \longleftarrow 206 \\ & \text{and the service set } k_j \text{ is not placed in host } h_i \\ 0 \cup 1 & AAcons_{k_j,h_i} = false \quad \longleftarrow 208 \\ & \text{and the service set } k_j \text{ may/may not be} \\ & \text{placed in host } h_i \end{cases} \quad (2)$$

$$\sum_{i=1}^{n} k_{ij} = 1 \quad \forall j = \{1 \ldots l\} \quad (3) \longleftarrow 210$$

$$kc_j = \sum s_{rj} sc_r \quad km_j = \sum s_{rj} sm_r \quad \forall r = \{1 \ldots m\} \quad (4) \longleftarrow 212$$

$$\sum_{i=1}^{n} kc_j k_{ij} \leq h_{ci} \quad \forall i = \{1 \ldots n\} \quad (5) \longleftarrow 214$$

$$\sum_{i=1}^{n} km_j k_{ij} \leq h_{mi} \quad \forall i = \{1 \ldots n\} \quad (6) \longleftarrow 216$$

$$Lc_i = \sum_{i=1}^{n} kc_j k_{ij} \quad Lm_i = \sum_{i=1}^{n} km_j k_{ij} \quad (7) \longleftarrow 218$$

$$rc_i = Lc_i - h_{ci} \quad rm_i = Lm_i - h_{mi} \quad (8) \longleftarrow 220$$

$$\bar{rc}_i = \frac{1}{n}\sum_{i=1}^{n} rc_i \quad \bar{rm}_i = \frac{1}{n}\sum_{i=1}^{n} rm_i \quad (9) \longleftarrow 222$$

$$\sigma(s) = \sqrt{\frac{1}{n}\sum_{i=1}^{n}(rc_i - \bar{rc}_i)} + \sqrt{\frac{1}{n}\sum_{i=1}^{n}(rm_i - \bar{rm}_i)} \quad (10) \longleftarrow 224$$

$$Minimize \quad \sigma(s) + mig\_count(s) \quad (11) \longleftarrow 226$$

FIG. 2

SELECTMIGSS (H) ———— 302
$avgCpu \leftarrow computeAverageCPU(H)$ ———— 304
for each $h_i \in H$ ———— 306
 do
 if $h_i.CPU() < avgCpu$ ———— 308
 then
 comment: host is an over-loaded host
 $\Big\{$ $K_i \leftarrow h_i.getServiceSets()$ ———— 312
 $count \leftarrow \lceil |K_i|/3 \rceil$ ———— 314
 Sort $K_i$ in ascending order of capacity ———— 316
 $Ksort_i \leftarrow$ Select first half from $K_i$ ———— 318
 Sort $Ksort_i$ in ascending order of anti-affinity constraints ———— 320
 $SS_i \leftarrow$ Select top $count$ number of service sets from $Ksort_i$ ———— 322
 $Migss \leftarrow SS_i$ ———— 324

| Host | CPU Used | RAM Used |
|---|---|---|
| 421 | 90 | 85 |
| 422 | 50 | 45 |
| 423 | 55 | 40 |
| 424 | 70 | 80 |
| 425 | 30 | 20 |
| 426 | 10 | 15 |

Average residual CPU: 49

②

| Host | CPU Used | RAM Used |
|---|---|---|
| 421 | 90 | 85 |
| 422 | 50 | 45 |
| 423 | 55 | 40 |
| 424 | 70 | 80 |

For Host 421

③

| Svc Set | CPU Used | RAM Used | Anti-Affinities |
|---|---|---|---|
| 411 | 15 | 10 | 432 |
| 412 | 5 | 5 | 430, 431, 432 |
| 413 | 10 | 15 | 435, 438 |
| 414 | 20 | 25 | 444, 431 |
| 415 | 23 | 20 | |
| 416 | 17 | 10 | 438 |

For Host 421

④

| Svc Set | Capacity | Anti-Affinities |
|---|---|---|
| 412 | 5 | 430, 431, 432 |
| 413 | 15 | 435, 438 |
| 411 | 15 | 432 |
| 416 | 17 | 438 |
| 415 | 23 | |
| 414 | 25 | 444, 431 |

For Host 421

⑤

| Svc Set | Capacity | Anti-Affinities |
|---|---|---|
| 412 | 5 | 430, 431, 432 |
| 413 | 15 | 435, 438 |
| 411 | 15 | 432 |

For Host 421

⑥

| Svc Set | Anti-Affinities |
|---|---|
| 411 | 432 |
| 413 | 435, 438 |
| 412 | 430, 431, 432 |

For Host 421

⑦

| Svc Set | Anti-Affinities |
|---|---|
| 411 | 414 |

⑧

| Migration Svc Set |
|---|
| 411 |
| ... |
| ... |

*Values are normalized on a scale of 0-100

FIG. 4

GALB (GARuns, Generations) ←— 502

DoInitialPlacement(H, K) ←— 504
for i ← GARuns ←— 506
do
  for j ← Generations ←— 508
  do
    ⎧ Migss ← SelectMigSS(H) ←— 510
    ⎪ select the migration service sets
    ⎪ parentSol ← GeneratePopulation(H, Migss, nsols) ←— 514
    ⎨ childSol_{cr} ← DoCrossover(parentSol) ←— 516
    ⎪ childSol_{cr,mut} ← DoMutation(childSol) ←— 518
    ⎪ bestSol ← DoSelection(parentSol, childSol_{cr,mut}) ←— 520
    ⎪ H_{removeSS} ← RemoveMigSS(H, Migss) ←— 522
    ⎪ the migration service sets are removed from the hosts
    ⎩ H ← DoBestMigSSPlacement(bestSol, H_{removeSS}) ←— 526
      add the migration service sets to the hosts in bestSol

METHOD AND SYSTEM TO REBALANCE CONSTRAINED SERVICES IN A CLOUD USING A GENETIC ALGORITHM

CROSS-REFERENCE TO RELATED APPLICATIONS

This application claims the benefit of U.S. Provisional Application No. 62/112,152, filed Feb. 4, 2015, which is hereby incorporated by reference.

FIELD

Embodiments of the invention relate to the field of load balancing; and more specifically, to a method and system to rebalance constrained services in a cloud using a genetic algorithm.

BACKGROUND

Currently many public cloud providers operate datacenters that are geographically distributed across many locations. Such datacenters host thousands of services, which are typically run on virtual machines. These virtual machines are typically running on multiple server end stations (e.g., a computing device) and each data center may have many hundreds of these server end stations. These services are then provided to cloud customers based on a pay-as-you-go model. Examples of services include content distribution services, cloud-based email, render farm services, etc. One large issue that cloud providers are faced with regularly is resource fragmentation and unbalance. These resources may include processor (CPU), memory, network, storage, and other resources. Resource fragmentation and load unbalance arise when existing services are stopped by cloud customers, due to server end station downtime, due to errors, or other reasons. For example, in the event of a server end station failure, services previously running on the server end station are terminated and/or restarted on another active server end station. When the failed server end station becomes available again, it does not host any services and thus resources are wasted. Similarly, if the cloud customers stop individual services, server end station resources are freed, thus creating resource fragmentation, whereby some server end stations have excess residual resource capacity and some do not. Resource fragmentation is especially bad for cloud providers as it prevents the cloud provider from accommodating more customers and thus reduces the overall revenue for the cloud provider.

One way to achieve improved resource utilization and load balance in the presence of stopped services and/or server failures is to perform load rebalancing. Load rebalancing aims at achieving a better load distribution by migrating already running services between servers. By performing load rebalancing Service Level Agreement (SLA) violations may be avoided due to shortage of resources on an over utilized server. SLAs define various performance guarantees between a provider and a customer. Load rebalancing may at the same time achieve a better utilized cloud environment.

Several approaches have proposed for load rebalancing. As a most optimal load rebalancing method would run very slowly (in non-deterministic polynomial-time hard or NP-hard), most of the related methods focus on heuristics and/or greedy algorithms. Specifically, load rebalancing algorithms can be classified into static or dynamic algorithms.

Static algorithms use the prior knowledge of resources and are suitable for stable environments in which the services' resource consumption do not vary over time. The round-robin algorithm is a famous static algorithm that allocates services on a first come first serve basis to (under-utilized) servers. The Central Load Balancing Decision Model is an improved round-robin algorithm where the server end station response time is measured. If the response time is above a threshold, then the server end station is over utilized and the service is allocated to the next server end station.

Dynamic algorithms take into account the changing demands of the services during the execution time. One example of a dynamic algorithm is Weighted Least Connections, which takes into account the number of services in a server when placing a new service. Another example is Exponential Smooth Forecast based on Weighted Least Connection. This algorithm uses a single exponential smoothing forecasting mechanism to predict the demand in real time based on the historical demand of the service. Yet another example is the Load Balance Min-Min algorithm that uses opportunistic load balancing for allocating tasks in an attempt to keep each server end station busy. This algorithm considers the execution time of each task and allocates tasks based on remaining server end station CPU capacity, remaining memory, and the transmission rate.

However, performing load rebalancing comes at the expense of service migration costs. Thus, many of the previous methods, which may not consider migration costs, may not be optimal. These previous methods may assume that the destination server end stations (where services are to be moved) are empty, and may not consider migration restrictions on individual services.

Thus, a better solution is desired that considers restrictions and minimizes migration costs.

SUMMARY

According to some embodiments of the invention, a method in a server end station coupled to one or more hosts for rebalancing one or more services running on the one or more hosts is described. The method includes receiving a rebalance request message. The method further includes performing an iteration of a rebalancing computation. The iteration includes selecting a set of one or more service sets for rebalancing, wherein each service set includes one or more services running on one of the one or more hosts, and wherein the selecting the set of one or more service sets is based on one or more service set constraints and one or more host constraints. The iteration further includes generating one or more candidate solutions, wherein each of the one or more candidate solutions includes a randomized one-to-one mapping of each of the set of one or more service sets to one of the one or more hosts, and wherein the one or more generated candidate solutions adhere the one or more service set constraints and the one or more host constraints. The iteration further includes performing one or more crossover operations on the one or more candidate solutions to generate additional candidate solutions. The iteration further includes performing one or more mutation operations on the one or more additional candidate solutions. The iteration further includes selecting as a solution one of the one or more candidate solutions that has a best fitness score, wherein a fitness score for a candidate solution is calculated based on the distribution of resources resulting from and number of migrations needed for the candidate solution.

The method further includes repeating the iteration of the rebalancing computation an additional number of times, wherein each time the selecting the set of one or more service sets is based on the mapping of the selected solution from the previous iteration. The method further includes migrating the one or more service sets to the one or more hosts based on the solution from the final rebalancing computation.

According to some embodiments, the one or more service set constraints comprises one or more anti-affinity constraints, and wherein two service sets that have an anti-affinity constraint with each other cannot run on a same host. According to some embodiments, each service in each of the one or more service sets have an affinity constraint with at least one other service in the same service set, and wherein two services that have the affinity constraint with each other must run on the same host. According to some embodiments, the one or more host constraints comprise residual processor resources and residual memory resources, wherein a service set can only run on a host that has more residual processor resources than the service set requires and has more residual memory resources than the service set requires.

According to some embodiments, the set of service sets for rebalancing is one or more subsets of service sets running on one or more over-utilized hosts in the one or more hosts, wherein each subset is a predetermined fraction of the service sets of that host that have the least number of anti-affinity constraints and use the least amount of processor and memory resources on their respective host.

According to some embodiments, the split point for the one or more crossover operations splits each candidate solution between those mappings in each candidate solution having service sets with anti-affinity constraints, and those mappings in each candidate solution having service sets with no anti-affinity constraints.

According to some embodiments, the one or more mutation operations randomly change the one of the one or more hosts that is mapped to a service set in one more of the additional candidate solutions.

According to some embodiments, the best fitness score for a candidate solution is a fitness score that, among the one or more candidate solutions, has the minimum amount of differences between the residual processor and residual memory among all the one or more hosts, and that has the minimum number of migrations needed to achieve the mapping in the candidate solution.

Thus, embodiments of the invention include a method and system to rebalance constrained services in a cloud using a genetic algorithm.

BRIEF DESCRIPTION OF THE DRAWINGS

The invention may best be understood by referring to the following description and accompanying drawings that are used to illustrate embodiments of the invention. In the drawings:

FIG. 2 illustrates a mathematical model 200 for the fitness function for a system and method for rebalancing constrained services in a cloud using a genetic algorithm according to an embodiment of the invention.

FIG. 3 illustrates a pseudocode 300 for selecting a subset of service sets for migration for a system and method for rebalancing constrained services in a cloud using a genetic algorithm according to an embodiment of the invention.

FIG. 4 illustrates an exemplary execution of the operations of pseudocode 300 on an exemplary number of service sets and hosts for a system and method for rebalancing constrained services in a cloud using a genetic algorithm according to an embodiment of the invention.

FIG. 5 illustrates a pseudocode 500 for finding a rebalancing solution for a system and method for rebalancing constrained services in a cloud using a genetic algorithm according to an embodiment of the invention.

DESCRIPTION OF EMBODIMENTS

Figure 1:
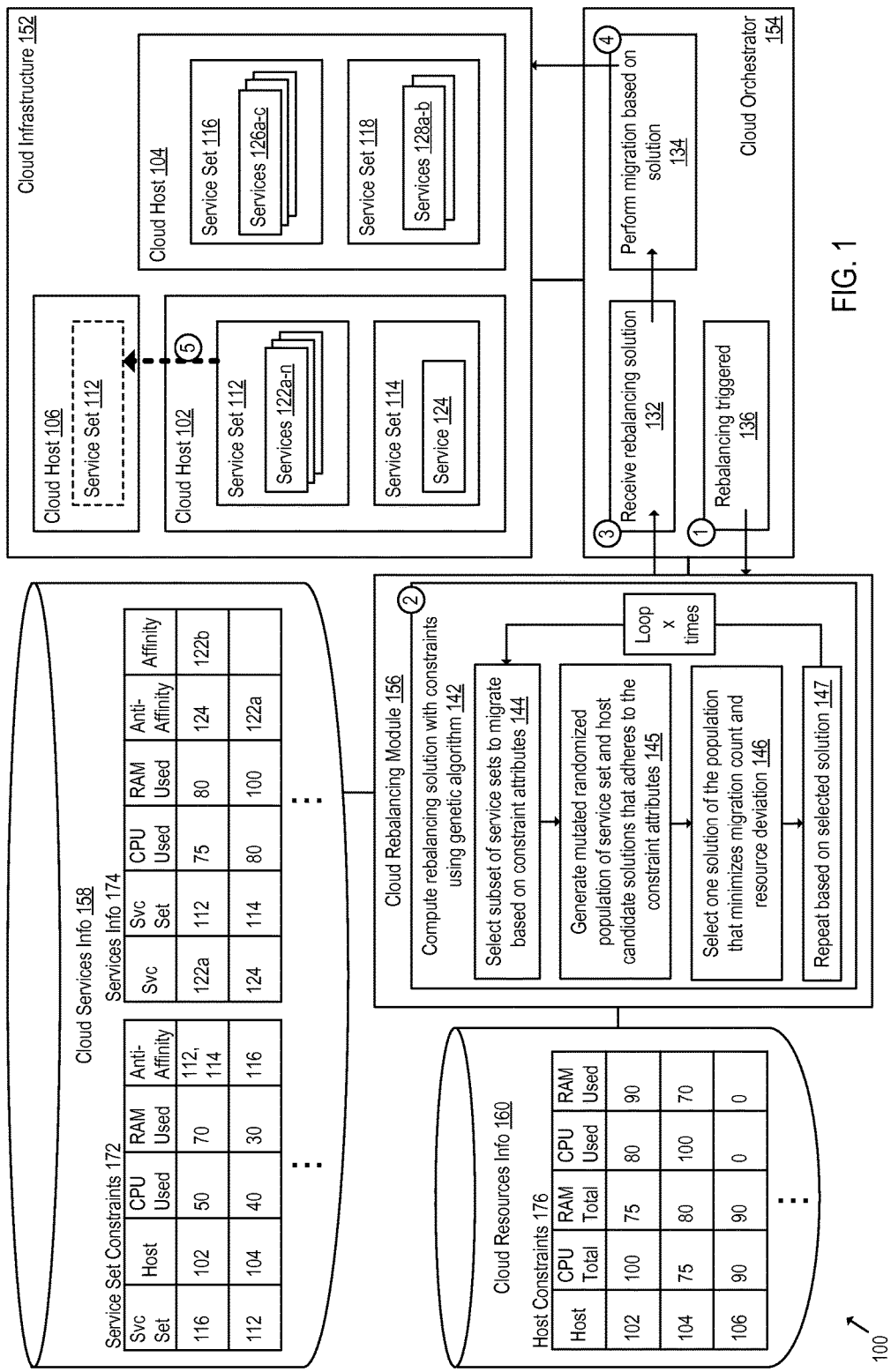
FIG. 1 illustrates a system 100 for rebalancing constrained services in a cloud using a genetic algorithm according to an embodiment of the invention.

The following description describes methods and apparatuses for data path performance measurement using test messages in a software defined network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

FIG. 1 illustrates a system 100 for rebalancing constrained services in a cloud using a genetic algorithm according to an embodiment of the invention. In FIG. 1, the circled numbers are used to denote transactions performed by the elements in the system. The order/sequence of the transactions in FIG. 1 is shown for illustrative purposes, and is not intended to be limitations of the present invention.

System 100 includes cloud services information 158 and cloud resources information 160. The cloud services info 158 and cloud resources info 160 may be stored on one or more storage devices or other storage medium that is accessible by cloud rebalancing module 156. Cloud services info 158 includes constraint information 172 on service sets, and in some embodiments cloud services info 158 includes information 174 on services.

A service is a software process, platform, infrastructure, or anything else that a cloud provider might provide to a client using computer-based technologies. Examples of service categories include software as a service (SaaS), platform as a service (PaaS), and infrastructure as a service (IaaS). Examples of services include customer relationship management, email servers, database software, web servers, virtual machines, storage servers, backup services, news delivery services, and gaming services.

Each service may have affinity or anti-affinity constraints with other services. One service has an affinity constraint with another service in the case where these two services should be placed together on the same host (e.g., a virtual machine). For example, a web server service serving financial information may advantageously be placed on the same host as a database service, so that the web server service can communicate with the database service to quickly retrieve data. If the services were placed in different hosts, the web server service might incur a higher time penalty when contacting the database, causing an extra delay in data retrieval.

Conversely, a service has an anti-affinity constraint with another service in the case where these two services should not be placed together on the same host. For example, a backup service and a database service should be placed in different hosts. If one of the hosts fails, the backup service in the other host is still able to provide service. In some cases, the anti-affinity constraints may indicate how far the physical separation between the two services should be (e.g., separate virtual machines, separate server end stations, separate data centers, separate geographic locations).

In these scenarios, anti-affinity constraints adhere to the law of transitivity. For example, if service A has an anti-affinity constraint with service B, and service B has an anti-affinity constraint with service C, then service A has an anti-affinity constraint with service C. The anti-affinity constraints also obey the law of symmetry. For example, if service A has an anti-affinity constraint with service B, then service B has an anti-affinity constraint with service A.

Both anti-affinity and affinity constraints may be determined by an administrator, by the customer using the services, or automatically by the system. For example, when the system determines that a web server is accessing another service frequently beyond a certain threshold, it may set both to have affinity constraints with each other. As another example, when the system determines that a web server is being backed up by another backup service, it may set both to have anti-affinity constraints with each other.

A service set includes one or more services where each service in the service set may have an affinity constraint with at least one other service in the service set. If a service has an affinity constraint with another service, those two services are included within the same service set. If a service has an anti-affinity constraint with another service, those two services are not included in the same service constraint. If two services neither have an affinity constraint or an anti-affinity constraint with each other, they may or may not be placed in the same service set. In some embodiments, only those services that have affinity constraints with each other are placed in a service set. All other services that have no affinity constraints with the services in that service set are placed in separate service sets.

When one service set include services that have anti-affinity constraints with services in another service set, these two service sets have anti-affinity constraints with each other. Due to this constraint, these two service sets are not placed on the same host. If two service sets that have anti-affinity constraints with each other are on the same host, then one of the service sets needs to be migrated off the host to avoid violating the anti-affinity constraint. Although in some cases not every service in a service set has an anti-affinity constraint with a service in the other service set, the system migrates entire service sets instead of the individual services within the service sets to avoid the anti-affinity constraint violation. In some embodiments, as service sets only contain services that have affinity constraints with each other, and as the anti-affinity constraints are transitive, as long as one service in the service set has an anti-affinity constraint with a service in another service set, the entire service set will have an anti-affinity constraint with the other service set.

Referring again to FIG. 1, and as noted above, cloud services info 158 includes service set constraints info 172 and may include services info 174. Services info 174 may include a service identifier, a service set identifier for the service set that the service is included in, the CPU resources that the service may use, the memory (random access memory or RAM) resources that the service may use, any anti-affinity constraints with other services, and any affinity constraints with other services. In some embodiments, the resource usage indicators are normalized. Although FIG. 1 depicts integer values for the resource usage values ranging from 0-100, the values may be in a different format or range in other cases. In some embodiments, when a service is added or removed from the cloud provider's system, the services info 174 is updated to reflect the change.

Cloud services info 158 includes a service set constraints 172. This service set constraints 172 indicates the resources that each service set may use, the host that the service set currently resides or runs on, and any anti-affinity constraints of that service set with any other service set. The information in the service set constraints 172 may be derived from the services info 174.

In some embodiments, after a service is added, the system (e.g. through the cloud orchestrator) may determine the correct service set to include the service in, or may create a new service set for that service, and update the service set constraints 172 with the information for the new service. For example, a service may be requested to be added that has an anti-affinity constraint with certain existing services. The system may find a service set that has the same anti-affinity constraints and place the service in that service set. Alternatively, if no matching service set is found, the system may create a new service set for that service. As another example, if a service to be added has affinity constraints with certain existing services (or additional services to be added), the system may place that service with the service set that includes those existing services.

In some embodiments, after a service is removed, the system may remove that service from the services info 174, and may update the service set constraints 172 to reflect the removal. For example, if a service to be removed had an anti-affinity constraint that is no longer needed, that anti-affinity constraint may be removed from the associated service set.

In addition to cloud services info 158, system 100 includes cloud resources info 160. Cloud resources info 160 includes host constraints 176. Host constraints 176 includes information about the total processor (CPU) and memory (RAM) resource capacity available for each host, as well as the processor and memory currently used for each host. In some embodiments, these values are normalized to a scale. For example, a particular processor speed or memory capacity is set to a benchmark scaled value (e.g., 100), and all other processor resources and memory resources are scaled to this benchmark.

In some embodiments, the information in the cloud services info 158 and cloud resources info 160 are updated in real time. Although in FIG. 1 the host constraints 176, service set constraints 172, and services info 174 are displayed as tables with particular columns and rows, in some embodiments the host constraints 176, service set constraints 172, and services info 174 are stored in a different format with different column values, such as in a database, flat file, or other storage format. In some embodiments, the cloud resources info 160 and the cloud services info 158 are stored together.

System 100 includes cloud infrastructure 152. Cloud infrastructure 152 includes the server end stations, virtual machines, network components, and other elements and devices used to run the various services. For example, a cloud service provider may have as its cloud infrastructure multiple datacenters situated across geographic distances, with each data center including network devices (e.g., switches, gateways, routers, firewalls), server end stations (e.g., x86 computers), and storage devices (e.g., network attached storage, RAID arrays).

Cloud infrastructure 152 includes one or more cloud hosts, which are represented in FIG. 1 by cloud hosts 102-106. A host may be a server end station or may be a virtual machine running on a server end station. Each host provides some degree of separation from another host, whether that separation be separate virtual machines on one server end station, different server end stations, different data centers, or different geographic locations. As service sets with anti-affinity constraints between each other are placed on different hosts, the separation between the hosts ensures that the anti-affinity constraint is met.

Some exemplary configurations of service sets, services, and hosts are shown in FIG. 1. Cloud host 102 includes service set 112 with multiple services 122*a-n* and service set 114 with one service 124. Cloud host 104 includes service set 116 with three services 126*a-c*, as well as service set 118 with two services 128*a-b*. As will be described later, if a rebalancing solution indicates service set 112 should be migrated to cloud host 106, then cloud host 106 includes the one service set 112.

Note that although only three hosts, four service sets, and a limited number of services are shown in FIG. 1, other embodiments may have an arbitrary combination of service sets, services, and hosts.

System 100 includes cloud orchestrator 154. Cloud orchestrator 154 may manage the connections and interactions among the various hosts, services, and service sets in the cloud infrastructure 152. Cloud orchestrator 154 can send one or more messages or communicate with the cloud infrastructure 152 to migrate or instruct the cloud hosts in the cloud infrastructure 152 to migrate service sets to and from other cloud hosts. Cloud orchestrator 154 may also be able to perform other tasks, such as creating virtual machines for cloud hosts, configuring settings for the cloud network, server end stations, and virtual machines, updating configuration information such as the cloud resource info 160 and cloud services info 158, provide an administrative interface to an administrator, gather statistics and data about the cloud, automate workflows such as backups, and other tasks for managing the cloud infrastructure 152 and related hardware and software.

System 100 includes cloud rebalancing module 156. Cloud rebalancing module 156 computes the rebalancing solution for the one or more service sets (e.g., service sets 112-118) in the cloud infrastructure 152 when requested to do so. Cloud rebalancing module 156 may be communicatively coupled to cloud services info 158, cloud resources info 160, and cloud orchestrator 154. Cloud rebalancing module 156 may send and receive messages to and from these various other modules, or alternatively (in the case where one or more of the cloud services info 158, cloud resources info 160, and cloud orchestrator 154 reside on the same host, virtual machine, or server end station as the cloud rebalancing module 156) the cloud rebalancing module 156 may instead communicate with these other modules via shared memory, a bus, inter-process communications, or other communications that may not involve network messages being passed.

As noted previously, the circled numbers are used to denote transactions performed by the elements in the system. In one embodiment, to rebalance the service sets in the cloud infrastructure 152, at circled number 1 a rebalancing is triggered (at block 136). Cloud rebalancing module 156 receives the request for rebalancing and at circled number 2, cloud rebalancing module 156 computes the rebalancing solution with constraints using a load rebalancing genetic algorithm (block 142). In some embodiments, the rebalancing is triggered periodically.

A genetic algorithm uses concepts from biological evolution to determine a near optimal solution for a problem that would take an unacceptable amount of time to solve using a brute force approach. The stochastic property of a genetic algorithm helps to explore the optimal solutions in the search space. A genetic algorithm belongs to the class of evolutionary algorithms and uses the techniques inspired by natural evolution, such as crossover, mutation and selection of the fittest. Genetic algorithms are iterative processes and each process is called a generation. A genetic algorithm starts from a random set of candidate solutions or "parents". Pairs of "parents" are selected to undergo crossover (mixing of genetic information) and mutation (random changes in the genes) to create two offspring (two additional candidate solutions). The fitness of the parents and the offspring are evaluated through a fitness function. The candidate solutions with the highest fitness will be chosen solution for the search space.

In order to compute the rebalancing solution, at block 144 the cloud rebalancing module 156 selects a subset of service sets for migration based on the constraint attributes in cloud services info 158 and cloud resources info 160. For example, only those service sets on over utilized hosts may be considered as candidates for migration in order to reduce the burden on the over utilized hosts. As another example, only those service sets that do not use a high amount (e.g., beyond a certain threshold) of CPU or memory resources may be considered as candidates for migration as migrating those service sets that use a large amount of resources may be more difficult and cause longer delays in the migration process, cause longer downtimes during the migration process, or be harder to migrate due to the lack of a destination host with significant residual resource capacity able to accommodate that service set. As yet another example, only those service sets that do not have a high number (e.g., beyond a certain threshold) of anti-affinity constraints with other service sets may be considered as candidates for migration as service sets with a high number of anti-affinity constraints may only be able to be moved to a very few number of destination hosts to avoid any constraint violations.

Among those candidate service sets, the cloud rebalancing module 156 may further only select a subset of these candidates. This may be done to reduce the load on the cloud so that not too many service sets are migrated during one rebalancing operation. This may also provide the benefit of easing the computation of the optimal solution, and may also allow a larger number of candidate solutions to be generated.

Once the subset of the service sets are selected, at block 145 the cloud rebalancing module generates a randomized population of candidate solutions. Each candidate solution is a mapping between the selected service sets and the available hosts (e.g., service set 112 to host 106). In some embodiments, the available hosts are not all the hosts in the system, but are rather those hosts that are under-utilized. At block 145, crossover and mutation operations are further performed on the candidate solutions.

At block 146, a fitness function is applied to each candidate solution. The fitness function scores each candidate solution based on distribution of resource usage among the hosts for each candidate solution and the number of migrations (migration count) from the current mapping that each candidate solution would need to achieve the mappings in each candidate solution. In some embodiments, the candidate solution that would result in the most uniform distribution of resources among the hosts and the least number of migration counts is the selected solution (i.e., the most "fit" candidate).

At block 147, the selected solution is applied in simulation to service sets in the cloud infrastructure 152. This simulated migration of the service sets results in a new mapping of service sets to hosts and new resource usage information and new remaining resource capacity information for the hosts. The new mapping and new resource information is used in block 144 to select a new subset of service sets based on this new mapping and information.

By using the solution from the previous iteration in the next iteration, the computation at block 142 attempts to converge more quickly at a more optimal rebalancing solution.

Once a predetermined number of iterations is performed, the cloud rebalancing module 156 sends the rebalancing solution (e.g., an ordered list of mappings between service sets and hosts) to the cloud orchestrator 154, which receives the solution at circled number 3 (block 132). At circled number 4 (block 134), cloud orchestrator performs the migration by sending one or more command and receiving one or more responses from the hosts (e.g., hosts 102-106) in cloud infrastructure 152. As an example, in FIG. 1 at circled number 5, service set 112 may be migrated to cloud host 106 to reduce the load on cloud host 102 and utilize the idle cloud host 106.

In some embodiments, in addition to the computation of the rebalancing solution including iterating the above operations a predetermined number of times (i.e., "generations"), the computation of the rebalancing solution itself may be repeated a predetermined number of times to compare the solutions from each computation with each other to avoid any outliers or statistically bad results. Although the above embodiments are described with relation to a cloud, the system is not limited to the cloud and in some embodiments, rebalancing module 156 is used for a distribution of hosts in a non-cloud environment, such as within the datacenter of an organization.

The proposed load rebalancing system and method described above provides many advantages. One advantage is that the system and method considers server-to-service affinity and anti-affinity constraints during load rebalancing. Another advantage is that it considers the placement of already running services and takes into account the migration cost while performing load rebalancing. Both aspects are important to running efficient (cloud) data centers. The first advantage allows the ability to have services with dependency (i.e., constraint) requirements. For example, for fault tolerance reasons cloud customers might require services to be hosted on distinct physical hosts (e.g., main and backup databases). The second advantage is a distinction to traditional load balancing which is concerned only with the initial placement of services. In contrast, the embodiments described above optimize the placement of already running services while minimizing the migration cost. The ability to optimize the placement of already running services is a key to avoiding data center resource fragmentation due to server power-cycling and/or stopping of services.

Additionally, using this modified form of a genetic algorithm that uses previous solutions in the iteration of the next generation in order to calculate a rebalancing solution has not been done in traditional solutions. Such a genetic algorithm is good candidate for this type of problem due to its polynomial time worst-case complexity. Given the NP-hardness of the load-rebalancing problem it is essential to be computationally efficient.

The system and method described above will be further described in detail with reference to FIGS. 2-10.

FIG. 2 illustrates a mathematical model 200 for the fitness function for a system and method for rebalancing constrained services in a cloud using a genetic algorithm according to an embodiment of the invention.

In some embodiments, mathematical model 200 illustrates the fitness function used in block 146 and described above to select the solution from multiple candidate solutions for one iteration (i.e., "generation") of the computation. However, the mathematical model 200 is provided for illustrative purposes and may not necessarily indicate the exact operation of the embodiments described herein.

Equation 1 on line 202 indicates that the service $s_r$ can be included (placed) only in one service set $k_j$. If an affinity constraint states that the service $s_r$ has an affinity constraint with at least one service in service set $k_j$, then $Acons_{sr,kj}$=true and $s_{rj}$=1. Otherwise, as indicated in equation 1 on line 204, if no affinity constraint exists then the service $s_r$ is not be placed in the service set $k_j$, $Acons_{sr,kj}$=false, and $s_{rj}$=0.

If an anti-affinity constraint indicates that service sr has an anti-affinity constraint with any service in a service set $k_j$, then $AAcons_{sr,kj}$=true. As noted above, anti-affinity constraints are checked at the level of the service set. Thus, if an anti-affinity constraint exists between a service included in service set $k_j$ and any service set in host $h_i$, then $AAcons_{kr,hj}$=true and so $k_{ij}$=0 as indicated by equation 2 on line 206 and service set $k_j$ is not included in on host $h_i$. However, if no anti-affinity constraint exists between service set $k_j$ and host $h_i$, then $AAcons_{kr,hj}$=false and the service set $k_j$ can be placed randomly in any host $h_i$, so $k_{ij}$=0∪1 as indicated in equation 2 on line 208. The affinity and anti-affinity constraints may be stored by the system in a cloud services info, such as cloud services info 158.

Equation 3 on line 210 indicates that the service set $k_j$ can be included (placed) in only one host $h_i$. Equation 3 indicates that for each service set j from 1 to l, the sum of the service set j0 on all hosts i is equal to one. Thus, there can only be one service set j among all the hosts.

Equations 4 on line 212 indicate the resources each service set needs. The CPU requirements are indicated by $kc_j$, which is calculated by summing all the individual CPU resource needs $sc_r$ for services in the service set (note that $s_{rj}$ is only equal to 1 for services in the service set). The memory requirements are indicated by $km_j$, which is calculated by summing all the individual memory resource needs $sm_r$ for services in the service set.

Equation 5 on line 214 indicates that a host should be able to meet the CPU requirements of a service set if the service set is included in that host. In equation 5, $h_{ci}$ represents the total host CPU capacity for a host $h_i$, and the total CPU requirements for all service sets on the host should be less than the total host CPU capacity.

Equation 6 on line 216 is similar to equation 5, but is directed towards memory requirement. Equation 6 indicates that a host should be able to meet the memory requirements of a service set if the service set is included in that host. In equation 6, $h_{mi}$ represents the total host memory capacity for a host $h_i$, and the total memory requirements for all service sets on the host should be less than the total host memory capacity.

Equation 7 on line 218 indicates the CPU and memory load (utilization) $Lc_j$ and $Lm_j$ on a host $h_i$. This is calculated by summing the utilizations of the service sets on each host.

Equation 8 on line 220 indicates the residual CPU and memory capacity $rc_i$ and $rm_i$ for a host $h_i$. This is calculated by taking the difference between the load $Lc_j$ and $Lm_j$ and the total capacity $h_{ci}$ and $h_{mi}$.

Equation 9 on line 222 indicates the average residual CPU and memory capacities and is calculated by averaging the values from equation 8 over a selection of hosts $h_1$ to $h_n$.

Equation 10 on line 224 indicates the sum of the standard deviation $\sigma(s)$ of the residual CPU capacity of the hosts and the standard deviation of the residual memory capacity of the hosts $h_1$ to $h_n$.

Equation 11 on line 226 indicates an exemplary fitness function that may be used in computing a rebalancing solution. For example, this fitness function may be used by the cloud rebalancing module 156 to determine a fitness score of candidate solutions at block 146. The exemplary fitness function is calculated by adding the standard deviation of the hosts being considered and mig_count, which denotes the number of migrations needed to achieve the mapping of the candidate solution. The candidate solution that minimizes this value is the solution that is chosen.

FIG. 3 illustrates a pseudocode 300 to select a subset of service sets to migrate for a system and method for rebalancing constrained services in a cloud using a genetic algorithm according to an embodiment of the invention. In some embodiments, pseudocode 300 illustrates the operations of block 144 which are described above to select a subset of service sets to migrate based on constraint attributes. However, the pseudocode 300 is provided for illustrative purposes and may not necessarily indicate the exact operations of the embodiments described herein.

FIG. 4 illustrates an exemplary execution of the operations of pseudocode 300 on an exemplary number of service sets and hosts for a system and method for rebalancing constrained services in a cloud using a genetic algorithm according to an embodiment of the invention. The exemplary execution in FIG. 4 will be used in conjunction with FIG. 3 to describe the operations indicated in pseudocode 300. In FIG. 4, the circled numbers are used to denote operations performed by the elements in the system. Any order or sequence of the operations is shown for illustrative purposes, and is not intended to be limitations of the present invention.

Referring to FIG. 3, line 302 indicates an identifier for the function in the pseudocode, which is "selectMigSS (H)", where H is an input and may represent hosts in the system and may also represent the mappings between hosts and service sets in the system. At line 304, the average residual CPU of all the hosts is calculated by "computeAverageCPU" and this value is placed in "avgCpu". Referring to FIG. 4, circled number 1 indicates the exemplary hosts of a system, along with the CPU and memory utilization of each host.

In some embodiments, these resource values (CPU and memory utilization) are normalized. In some embodiments, a host with the fastest CPU or highest memory capacity among all the hosts is given a normalized CPU or memory score that is at the top of a normalized scale. All other CPU and memory scores are normalized based off this scale. For example, if a host has a CPU that is half as powerful as the host with the fastest CPU, then if the fastest CPU is scaled to a score of 100, the CPU with half the speed has a score of 50. Furthermore, if a process uses half the CPU resources of the CPU with a score of 50, then the CPU load for that resource is given a score of 25.

For the purposes of illustration and for ease of understanding, all exemplary hosts in FIG. 4 have the same CPU and memory capacities (i.e., abilities), and a usage score of 100 indicates 100% usage of that capacity. For the exemplary hosts of FIG. 4, the average CPU usage is 51, and thus the average residual CPU is 49.

Referring back to FIG. 3, line 306 indicates a loop that iterates through each host. Line 308 indicates a conditional statement that checks whether the residual CPU of the host being processed on the current iteration (current host) is less than the average residual CPU (i.e., whether the current host is over utilized). If this is true, execution proceeds through lines 312-324. Otherwise, execution skips this host and continues to the next one. In FIG. 4, as shown in circled number 1, hosts 425 and 426 have residual CPU values above the average residual CPU, and thus are not considered for the subsequent calculation. Circled number 2 shows the hosts 421, 422, 423, and 424 that are selected to have their service sets considered for migration. Using this method, the service sets on over-utilized hosts are considered for migration, and the service sets on under-utilized hosts are not disturbed.

Referring back to FIG. 3, line 312 indicates that the list of service sets for the current host is placed in $K_i$. In some embodiments, the service set information may be retrieved from cloud services info 158. In FIG. 4, the exemplary host for the current iteration is host 421. Circled number 3 indicates all the service sets for host 421 and the respective resource usage and anti-affinity information for these service sets. In some embodiments, this information is retrieved from cloud services info 158 and cloud resources info 160.

Referring to FIG. 3, line 314 indicates that the variable count is set to one-third of the number of service sets of $K_i$. In some embodiments, when the computed count value is not a whole number, it is rounded up or down to the nearest whole number. In FIG. 4, $K_i$ for host 421 (i=421) is the set of 6 service sets shown at circled number 3. The count for host 421 would thus be the number 2 (6/3=2).

Referring back to FIG. 3, line 316 indicates that $K_i$ is sorted in ascending order of capacity. In some embodiments, the capacity is the normalized value of CPU use or memory use, whichever is greater. In FIG. 4, at circled number 4, the service sets from circled number 3 are sorted according to their capacity values in ascending order. In FIG. 4, the capacity value at circled number 4 is the greater of either the CPU used or RAM used for each service set.

Referring back to FIG. 3, line 318 indicates that the first half $K_i$ is then selected and placed in $Ksort_i$. Thus, the one half of the service sets with lesser capacity usage are placed in $Ksort_i$. In FIG. 4, at circled number 5, the first half of the sorted service sets of host 421 from circled number 3 are selected. These are the three service sets 412, 413, and 411. This selection is made so that those service sets that consume heavy CPU or memory resources are not disturbed. Disturbing these service sets by migrating them may create significant performance and downtime penalties in the system, and those service sets with large capacity requirements may not have a large selection of destination hosts.

Referring back to FIG. 3, line 320 indicates that the service sets remaining in $Ksort_i$ are sorted in ascending order according to the number of anti-affinity constraints of each service set. Line 322 indicates that the top count (i.e., top third) of these service sets are placed in $SS_i$, which is the set of service sets from the current host that are to be considered for migration. In FIG. 4, at circled number 6, the service sets are sorted in ascending order by their number of anti-affinity constraints (as indicated in line 320). For example, service set 411 has one anti-affinity constraint (with 432), service set 413 has two anti-affinity constraints, and service set 412 has three anti-affinity constraints. At circled number 7, the top count of the service sets indicated at circled number 6 are selected. As the exemplary service sets in FIG. 4 are for illustrative purposes, the number of service sets in host 421 for FIG. 4 is small, and so selecting the top third of the remaining service sets results in just service set 411 being selected. By selecting the service sets with the lesser number of anti-affinity constraints, more placement options for the service sets are possible, which means more candidate solution mappings are possible. This helps the solution computation to explore a wide range of candidate solutions for a more optimal load rebalancing solution. Additionally, by placing a limit on number of service sets being migrated from a particular host, the system avoids the issue where most of the service sets from an over-utilized host are migrated making that host under-utilized.

Referring back to FIG. 3, line 324 indicates that the selected service sets are added to a global set of migration service sets, or $Mig_{SS}$. As the selected service sets are added to the global list, they may simultaneously or asynchronously be sorted in descending order descending order of the number of anti-affinity constraints of each service set. This sorting helps to avoid unfeasible solutions as the highly restricted service sets (i.e. a service set with more anti-affinity) may be placed first.

Although here the count is set to the top one-third of the service sets, and although here the hosts are selected if they have residual CPU resources below the average residual CPU, and although here the top half of all service sets for the host are selected for sorting, these values (one-third, average residual CPU, and top half of service sets) may in other embodiments be set to different values.

Such a selection method helps to minimize costs and has many advantages. One advantage is that the existing system state is not modified completely. Only the heavily loaded hosts are considered. Another advantage is that only those service sets which have lower CPU and memory usage are considered for migration. Migrating services with higher capacity usage may incur more SLA violations during migration than a lesser capacity usage service. One reason for this is that migrating a service with higher capacity usage requires more initial setup time on a new host than a service that has a lower capacity usage. The solution space is also comparatively reduced. Another advantage is that in heavily loaded hosts, the service sets that have lower number of anti-affinity constraints are selected so that a placement solution can easily be found and unfeasible solutions can be avoided.

FIG. 5 illustrates a pseudocode 500 to find a rebalancing solution for a system and method for rebalancing constrained services in a cloud using a genetic algorithm according to an embodiment of the invention. In some embodiments, pseudocode 500 illustrates the operations of block 145, 146, and 147 which are described above to generate candidate solutions, select one solution of the candidate solutions, and repeat the iteration for multiple generations using the solutions from the previous iterations. As noted previously with reference to FIG. 2, one goal of the operations indicated in pseudocode 500 is determine a rebalancing solution that minimizes the variation of resource usage and the number of migrations across all the hosts. However, the pseudocode 500 is provided for illustrative purposes and may not necessarily indicate the exact operations of the embodiments described herein.

Figure 6:
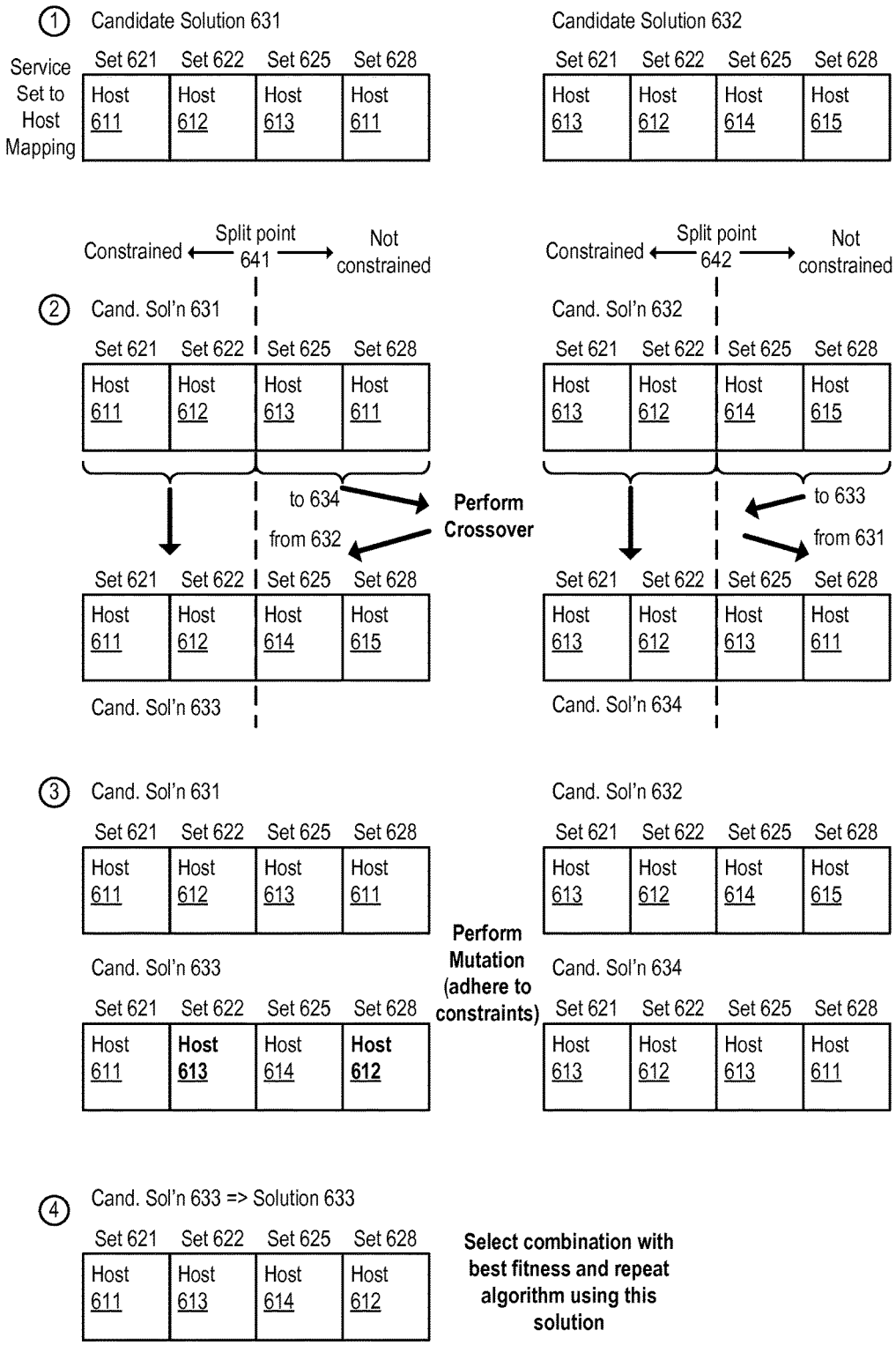
FIG. 6 illustrates an exemplary execution of the operations of pseudocode 500 on an exemplary number of candidate solution mappings of service sets and hosts for a system and method for rebalancing constrained services in a cloud using a genetic algorithm according to an embodiment of the invention.

FIG. 6 illustrates an exemplary execution of the operations of pseudocode 500 on an exemplary number of candidate solution mappings of service sets and hosts for a system and method for rebalancing constrained services in a cloud using a genetic algorithm according to an embodiment of the invention. The exemplary execution in FIG. 6 will be used in conjunction with FIG. 5 to describe the operations indicated in pseudocode 500. In FIG. 6, the circled numbers are used to denote operations performed by the elements in the system. Any order or sequence of the operations is shown for illustrative purposes, and is not intended to be limitations of the present invention.

Referring to FIG. 5, line 502 indicates the name of the function in pseudocode 500. The name is "GALB" (genetic algorithm load balancing) and accepts parameters GARuns and Generations. As described in more detail below, GARuns indicates how many times to run the genetic algorithm, and Generations indicates how many generations each run of the genetic algorithm should iterate through.

Line 504 indicates that an initial placement ("doInitialPlacement") of the hosts and the service sets K should be performed before any load rebalancing. In some embodiments, the initial placement also adheres to the resource and (anti-)affinity constraints of the hosts and the service sets. In some embodiments, the initial placement also attempts to minimize the variation (standard deviation) in resource usage among the hosts. In some embodiments, the genetic load rebalancing algorithm does not perform an initial placement each time the load rebalancing algorithm is run. Instead, the initial placement is performed only once during an initiation of the entire system.

The load rebalancing process described by the pseudocode 500 in FIG. 5 may be triggered periodically, by an administrator, when a service is added or removed, when a host is added or removed, when hardware capabilities are changed, when service resource usage is modified, or when any other change occurs in the cloud infrastructure.

Line 506 indicates that the algorithm is repeated for a number of runs equal to GARuns. Each run is independent of each other. One reason why multiple runs are made is that the genetic algorithm generates random candidate solutions. A single run of the algorithm may not always result in the most optimal solution, as the algorithm may inadvertently settle on a local minima that is not close to the globally optimal minimum. By having the results from a number of runs, the outlier solutions may be discarded leaving those solutions that have a high likelihood of being close to the actual minimum.

Line 508 indicates that the following loop is performed for multiple iterations equal to the value Generations. Unlike the GARuns loop indicated in line 506, each iteration (except the initial iteration) of the Generations loop is based on the service set and host mapping solution from the previous iteration. The initial iteration is based off the initial or existing mapping. This allows each iteration to improve on the results of the previous iteration. The details of the iteration will be described below.

Line 510 indicates that a subset of service sets are selected for migration using the function selectMigSS (H) described with reference to FIG. 3 and FIG. 4 above. This subset of service sets are placed in $Mig_{SS}$, the migration service sets.

Line 514 indicates that a population of candidate solutions ("chromosomes") is generated using the function generatePopulation (H, $Mig_{SS}$, nsols). H may represent the number of hosts in the system as well as the mapping between service sets and hosts in the system. nsols may represent the number of candidate solutions that should be generated. As shown in line 514, these generated candidate solutions are placed in parentSol. To generate each candidate solution, each service set in the selected subset of service sets ($Mig_{SS}$) is assigned or mapped to a random host from the hosts in the system. Thus, each candidate solution includes a mapping of every migration service set with a randomly selected host. When assigning each (migration) service set to a host, the system checks the CPU and memory constraints of the host and the anti-affinity constraints (if any) of the service set. If the host has some service sets to which the migration service set has an anti-affinity constraint, then that host is skipped and another random host is chosen. In some embodiments, the hosts are randomly placed on a list. In this case, each host in the list is iterated through until a compatible host (with no resource or anti-affinity constraint issues) is found. The service set is then placed on that host. In case the migration service set cannot be placed on any host, a new randomly generated hosts list may be used. If the migration service sets can be successfully placed, then a feasible solution is possible.

In FIG. 6, these candidate solutions are shown at circled number 1. For ease of understanding and illustration, only two candidate solutions, candidate solutions 631 and 632, are shown. However, in an execution a large number of solutions may be randomly generated. Candidate solution 631 indicates that four service sets, service sets 621, 622, 625, and 628, have been selected as the $Mig_{SS}$. In candidate solution 631, these are mapped to hosts 611, 612, 613, and 611, respectively (a host may have more than one service set, but a service set may only reside on one host). In candidate solution 612, the migration service sets are mapped to hosts 613, 612, 614, and 615, respectively. The candidate solutions may be referred to as "chromosomes" and each mapping between a service set and a host may be referred to as a "gene". Although the hosts and service sets are represented as so in FIG. 6, this is for illustrative purposes and in some embodiments the representation may be via an ordered list, database, flat file, or other data structure, and the host and service sets may be identified by an identification (ID) value.

Referring back to FIG. 5, line 516 indicates that a crossover operation ("doCrossover( )") should be performed on the previously generated candidate solutions (parentSol) to generate a set of crossed over candidate solutions (child-$Sol_{cr}$). In a crossover, the system randomly selects a pair of candidate solutions from the total set of solutions (parent-Sol). If a randomly generated probability value is greater than a predefined crossover probability threshold value, crossover is performed on the pair of candidate solutions. Otherwise, crossover is not performed. If crossover is performed, each candidate solution in the pair is split at a point separating those service sets with any anti-affinity constraints and those service sets with no anti-affinity constraints. As noted previously, the service sets to be migrated are sorted by the number of anti-affinity constraints of each (in descending order). Since the service set is sorted by anti-affinity constraint, the split point is guaranteed to divide all service sets with anti-affinity constraints and all service sets without anti-affinity constraints.

A one-point crossover is then performed at the split point described above. When crossing over, the service set mappings to each side of the split point in one of the two candidate solutions are swapped with the corresponding service set mappings of the other pair. In FIG. 6, a crossover operation is performed on the exemplary candidate solutions 631 and 632 are crossed s each other at the split point 641 and 642, respectively. This creates two new candidate solutions 633 and 634. Candidate solution 633 includes the mappings of set 621 to host 611 and set 622 to host 612 from candidate solution 631, but also contains the crossed over mappings ("genes") of set 625 to host 614 and set 628 to host 615. The same crossed over mappings can be seen in candidate solution 634.

Since the anti-affinity constraints obey the symmetric and transitive laws, anti-affinity constraint violations do not need to be checked again during the crossover operation. However, CPU and memory constraint violations should still be checked for the new candidate solutions (e.g., crossover creates candidate solution that would exceed resource capacity of host). If these resource constraints are violated, the crossover is not performed.

Referring back to FIG. 5, line 518 indicates that a mutation operation should be performed on the new candidate solutions created from the crossover operation to generate a set of crossed-over and mutated candidate solutions (child-Sol$_{cr, mut}$). To perform the mutation, a random probability value is generated for each crossed over candidate solution, and if that value happens to be greater than a predefined mutation probability threshold value, then mutation is performed. Otherwise, mutation is skipped. If mutation is performed, each service set in the candidate solution mapping is mapped to a randomly generated host. Both anti-affinity and capacity constraints (CPU and memory constraints) are checked during this new host assignment. In FIG. 6, at circled number 3, a mutation operation is performed on the new candidate solutions 633 and 634. The random value generated for candidate solution 634 may not have exceeded the threshold, and so mutation is not performed for candidate solution 634. However, mutation is performed for candidate solution 633. The mutation is indicated in bold, where host 612 is randomly changed to host 613, and host 615 is randomly changed to host 612.

Referring back to FIG. 5, after crossover and mutation is performed, line 520 indicates that the best candidate solution based on the fitness function described above with reference to FIG. 2 is selected ("doSelection( )") from all the candidate solutions. As described above, based on the fitness function, the best candidate solution is the one that minimizes the standard deviation in CPU and memory residual capacity among the hosts (i.e., equally distributes load among the hosts) and minimizes the number of migrations needed to achieve the mapping in the candidate solution. In other words, the solution chosen from the candidate solutions is the candidate solution that most evenly distributes the load among all the host and takes the least number of migrations of service sets to achieve. In FIG. 6, circled number 4 indicates that candidate solution 633 has the lowest (and thus best) score among all the candidate solutions when the fitness function is applied to them. Thus, candidate solution 633 is chosen as the solution for this iteration.

Referring back to FIG. 5, line 522 indicates that the migration service sets are removed from the hosts H, and at line 526, these migration service sets are placed on the hosts H according to the mapping of the solution determined by the operations indicated at line 520. Here, hosts H may represent a simulated mapping between all the hosts in the system and all the service sets. By removing or placing service sets into H accord to some mapping, the actual mapping in the cloud infrastructure 152 is not affected. Instead, H represents a simulation of the cloud infrastructure, including the resource usage and anti-affinity constraints on each host for the simulated mapping.

After the simulated mapping in H is updated with the best solution from the previous iteration of the loop indicated in line 508, this loop is executed again for a next generation. In the next generation, the selection of the migration service set is based on the simulated mapping that was created in the previous iteration. Each subsequent iteration uses the updated simulated mapping of the previous iteration, and thus each generation may converge on a more and more optimal solution.

The selection of the numbers for Generations and GARuns may be based upon empirical data and may be different for each configuration of a cloud infrastructure. For example, an administrator may determine that a particular combination of Generations and GARuns typically converges upon a stable and optimal result in the least number of iterations after running multiple experiments. A possible value for GARuns is between five and 10. A possible value for Generations is 20. In some embodiments, the system may be able to self-execute simulations of the rebalancing algorithm using random GARuns and Generations values to determine the optimal combination of these values.

Once the iterations of the loops indicated in lines 508 and 502 are finished, a final solution is yielded in the simulated mapping H. This mapping may then be used to actually migrate the service sets in the cloud infrastructure.

Figure 7:
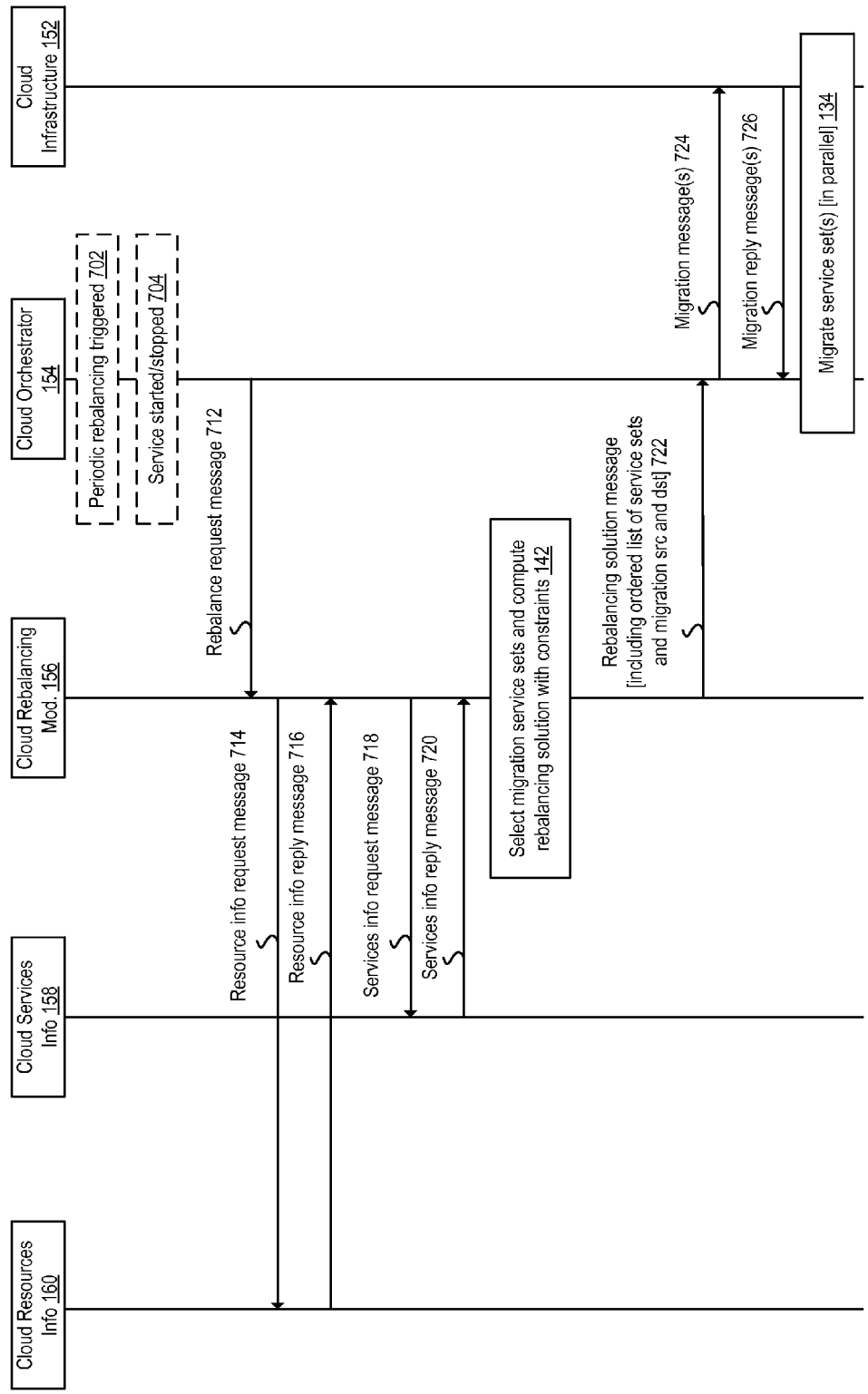
FIG. 7 illustrates a transaction diagram 700 for rebalancing constrained services in a cloud using a genetic algorithm according to an embodiment of the invention.

FIG. 7 illustrates a transaction diagram 700 for rebalancing constrained services in a cloud using a genetic algorithm according to an embodiment of the invention.

In some embodiments, at block 702 (at the cloud orchestrator 154), a periodic rebalancing is triggered at the cloud orchestrator 154. In some embodiments, at block 704, a service in the cloud infrastructure 152 has been started or stopped via the cloud orchestrator 154. In other embodiments, a manual rebalancing or other event causes the cloud orchestrator 154 to begin the rebalancing process. Once cloud orchestrator 154 determines that rebalancing is needed, it sends a rebalancing request message 712 to the cloud rebalancing module 156. Cloud rebalancing module 156 receives the rebalancing request, and sends a resource info request message 714 to the cloud resources info 160 and a services info request message 718 to the cloud services info 158.

Cloud resources info 160 responds with a resource info reply message 716 and cloud services info 158 responds with a services info reply message 720. These reply message the include (real time) anti-affinity and resource constraint information for the service sets in the cloud infrastructure

152, and may also include the mapping information between hosts and service sets in the cloud infrastructure 152.

Once cloud rebalancing module 156 receives the information from cloud resources info 160 and cloud services info 158, at block 142, cloud rebalancing module 156 selects the migration service sets and computes the rebalancing solution with constraints. Subsequently, cloud rebalancing module 156 sends a rebalancing solution message 722 to the cloud orchestrator 154. In some embodiments, the rebalancing solution message includes an ordered list with each service set to be migrated and the migration source and destination hosts for that service set.

Cloud orchestrator 152 may then send one or more migration messages 724 to the cloud infrastructure 152, and the individual hosts in the cloud infrastructure may reply with one or more migration reply messages 726. These messages are used by the cloud orchestrator 154 to migrate the service sets in the cloud infrastructure 152 according to the rebalancing solution provided by the cloud rebalancing module 156.

The rebalancing may occur in parallel or in sequence. If the migration is performed in parallel, the cloud orchestrator 152 performs the migration in such a way so that the order of the migration does not cause any constraints to be violated. For example, the some migrations may block on other migrations, and although some are performed in parallel, others wait for another migration to complete. If the migration is performed sequentially, constraint violations are not as big of an issue. During migration, the cloud orchestrator 152 may also utilize a temporary host to offload a service set to before moving it to its final destination depending on capacity constraints.

Figure 8:
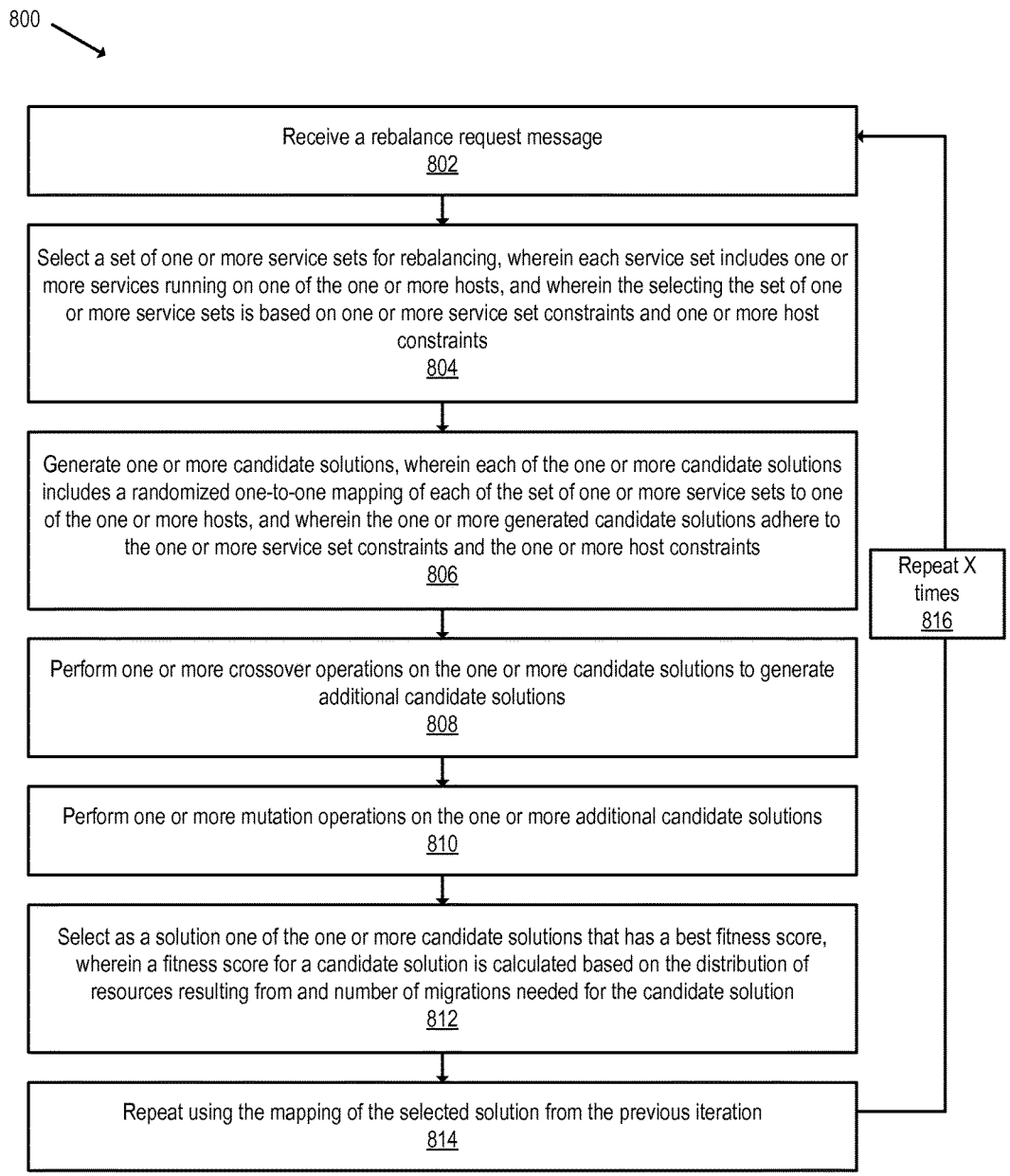
FIG. 8 is a flow diagram illustrating a method 800 for rebalancing constrained services in a cloud using a genetic algorithm according to an embodiment of the invention.

FIG. 8 is a flow diagram illustrating a method 800 for rebalancing constrained services in a cloud using a genetic algorithm according to an embodiment of the invention. For example, method 800 can be performed by the cloud rebalancing module 156. Method 800 may be implemented in software, firmware, hardware, or any combination thereof.

At block 802, cloud rebalancing module 156 receives a rebalance request message. In some embodiments, this message is received from cloud orchestrator 154. At block 804, cloud rebalancing module 156 selects a set of one or more service sets for rebalancing, wherein each service set includes one or more services running on one of the one or more hosts, and wherein the selecting the set of one or more service sets is based on one or more service set constraints and one or more host constraints.

In some embodiments, the one or more service set constraints comprise one or more anti-affinity constraints, wherein two service sets that have an anti-affinity constraint with each other cannot run on the same host. In some embodiments, each service in each of the one or more service sets have an affinity constraint with at least one other service in the same service set. In some embodiments, the one or more host constraints comprise residual processor resources and residual memory resources, wherein a service set can only run on a host that has more residual processor resources than the service set requires and has more residual memory resources than the service set requires.

In some embodiments, the set of service sets for rebalancing is one or more subsets of service sets for one or more over-utilized hosts in the one or more hosts, wherein each subset is a predetermined fraction of the service sets of that host that have the least number of anti-affinity constraints and use the least amount of processor and memory resources on their respective host.

At block 806, cloud rebalancing module 156 generates one or more candidate solutions, wherein each the one or more candidate solutions includes a randomized one-to-one mapping of each of the set of one or more service sets to one of the one or more hosts, and wherein the one or more generated candidate solutions adhere to set of one or more service set constraints and one or more host constraints.

At block 808, cloud rebalancing module 156 performs one or more crossover operations on the one or more candidate solutions to generate additional candidate solutions. In some embodiments, the split point for the one or more crossover operations splits each candidate solution between those mappings in each candidate solution having service sets with anti-affinity constraints, and those mappings in each candidate solution having service sets with no anti-affinity constraints.

At block 810, cloud rebalancing module 156 performs one or more mutation operations on the one or more additional candidate solutions. In some embodiments, the one or more mutation operations randomly change the one of the one or more hosts that is mapped to a service set in one more of the additional candidate solutions.

At block 812, cloud rebalancing module 156 selects as a solution one of the one or more candidate solutions that has a best fitness score, wherein a fitness score for a candidate solution is calculated based on the distribution of resources resulting from and number of migrations needed for the candidate solution. In some embodiments, the best fitness score for a candidate solution is a fitness score that, among the one or more candidate solutions, has the minimum amount of differences between the residual processor and residual memory among all the one or more hosts, and that has the minimum number of migrations needed to achieve the mapping in the candidate solution At block 814, cloud rebalancing module 156 repeat using the mapping of the selected solution from the previous iteration. At block 816, the flow is repeated X number of times. In some embodiments, X is the same as the value of Generations.

The operations in the flow diagrams have been described with reference to the exemplary embodiments of the other figures. However, it should be understood that the operations of this flow diagram can be performed by embodiments of the invention other than those discussed with reference to the other figures, and the embodiments of the invention discussed with reference to these other figures can perform operations different than those discussed with reference to the flow diagrams.

Figure 9:
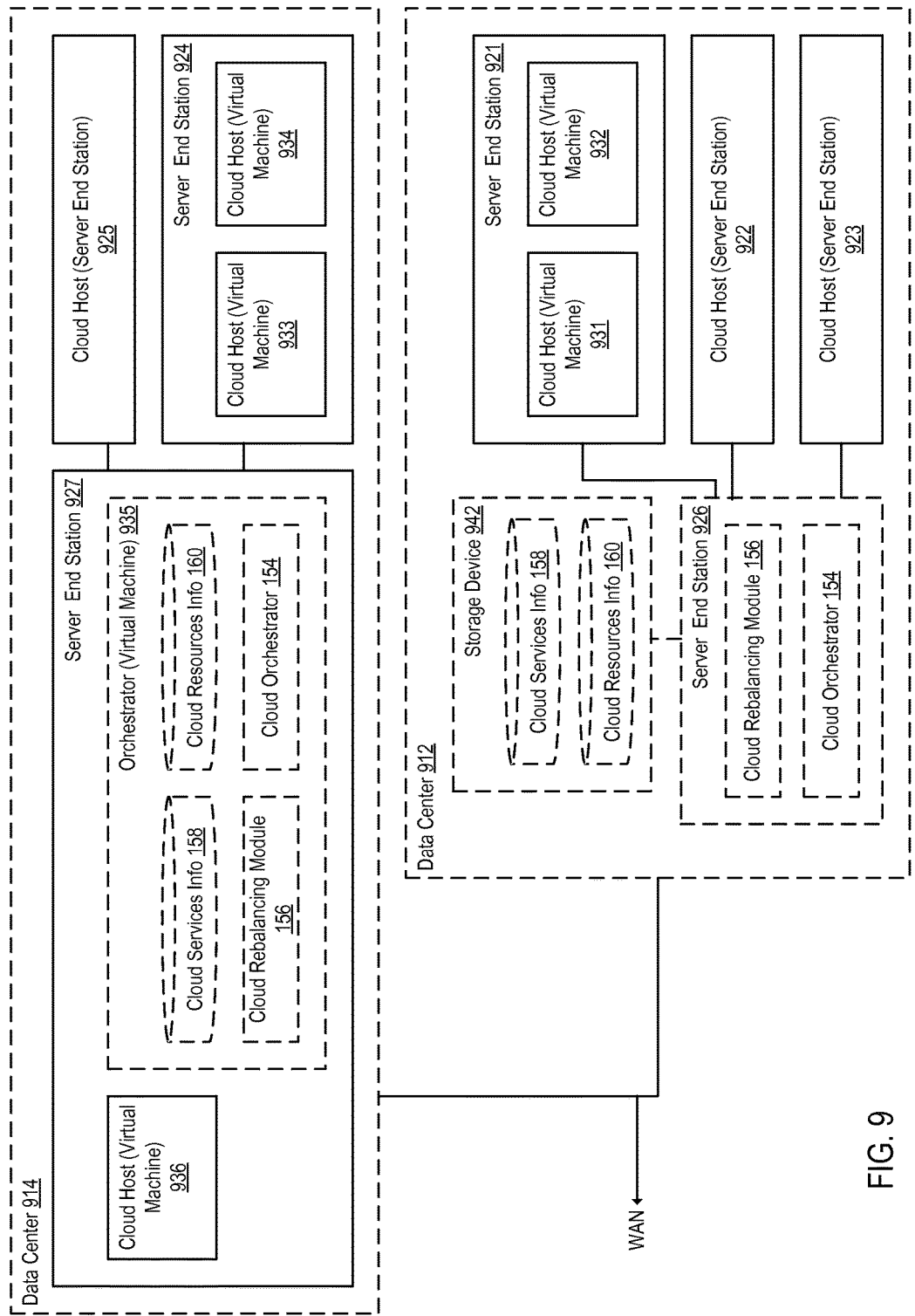
FIG. 9 illustrates an exemplary hardware deployment in a system 900 for rebalancing constrained services in a cloud using a genetic algorithm according to an embodiment of the invention.

FIG. 9 illustrates an exemplary hardware deployment in a system 900 for rebalancing constrained services in a cloud using a genetic algorithm according to an embodiment of the invention. Although system 100 in FIG. 1 shows the cloud services info 158, cloud resources info 160, cloud orchestrator 156, and cloud rebalancing module 156 in a possible implementation, the invention is not limited to such an implementation, and the modules and elements of the system may be arranged in any combination of ways. For example, as shown in system 900, the cloud services info 158, cloud resources info 160, cloud orchestrator 156, and cloud rebalancing module 156 may be software components executing in a virtual machine 935 on a server end station 927 of a data center 914. Alternatively, cloud services info 158 and cloud resources info 160 may reside within a storage device 942, which is communicatively coupled to a server end station 926 running the software modules of the cloud orchestrator 156 and the cloud rebalancing module 156.

Additionally, the cloud infrastructure may take many forms. For example, a cloud host 925 may be a standalone server end station. Alternatively, a cloud host 933 may be a virtual machine running on a server end station 924.

Figure 10:
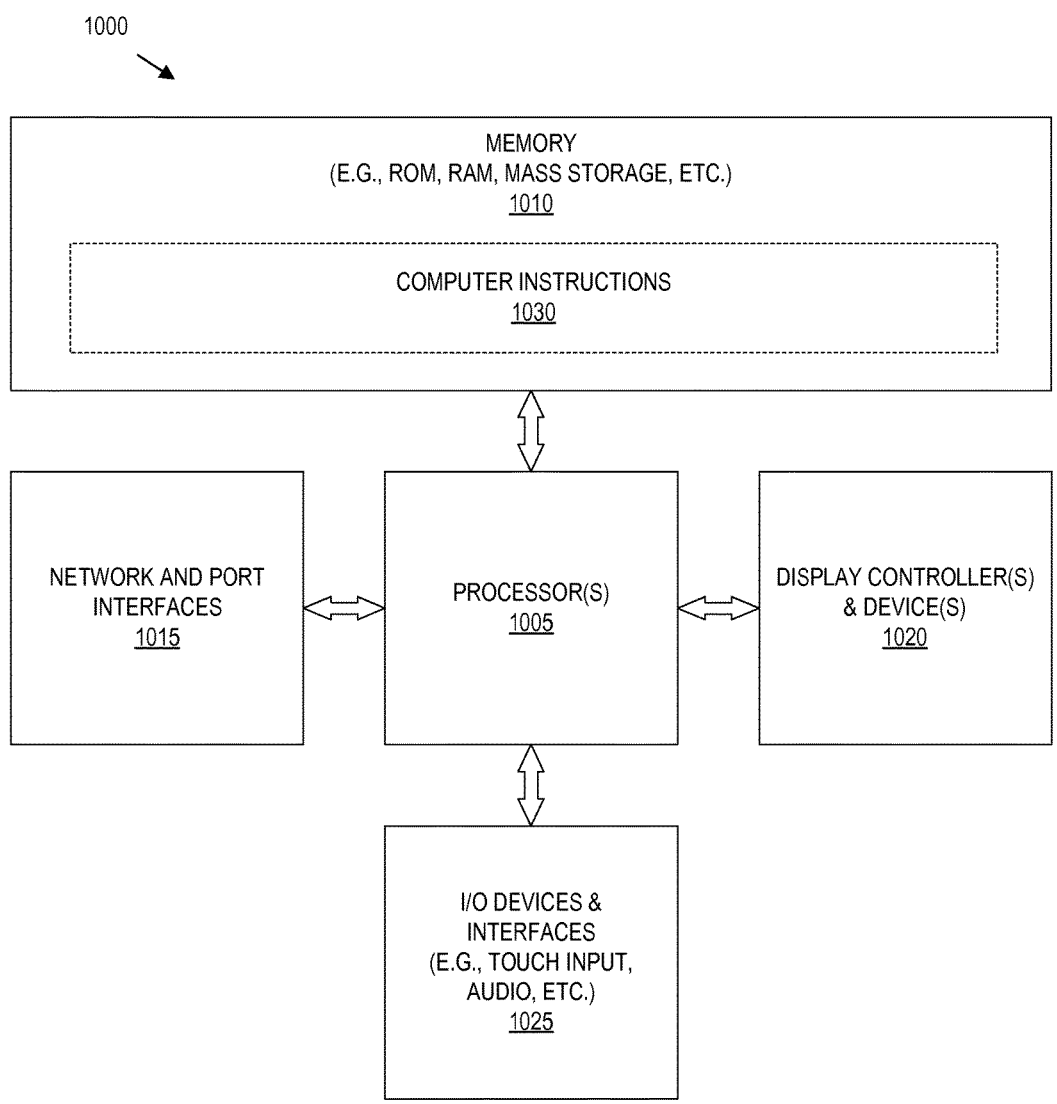
FIG. 10 illustrates a block diagram for an exemplary data processing system 1000 that may be used in some embodiments.

FIG. 10 illustrates a block diagram for an exemplary data processing system 1000 that may be used in some embodiments. Data processing system 1000 includes one or more microprocessors 1005 and connected system components (e.g., multiple connected chips). Alternatively, the data processing system 1000 is a system on a chip. One or more such data processing systems 1000 may be utilized to implement the functionality of the modules, server end stations, hosts, or other devices as illustrated above in FIGS. 1-9.

The data processing system 1000 includes memory 1010, which is coupled to the microprocessor(s) 1005. The memory 1010 may be used for storing data, metadata, and programs for execution by the microprocessor(s) 1005. For example, the depicted memory 1010 may store computer instructions 1030 that, when executed by the microprocessor(s) 1005, causes the data processing system 1000 to perform the operations described herein. The memory 1010 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 1010 may be internal or distributed memory. In some embodiments, a portion or all of the computer instructions 1030 are stored on an external cloud device.

The data processing system 1000 may also include a display controller and display device 1020 that provides a visual user interface for the user, e.g., GUI elements or windows. The display device 1020 may also display various media content to the user. The data processing system 1000 also includes one or more input or output ("I/O") devices and interfaces 1025, which are provided to allow a user to provide input to, receive output from, and otherwise transfer data to and from the system. These I/O devices 1025 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1000. The I/O devices and interfaces 1025 may also include a connector for a dock or a connector for a USB interface, FireWire, Thunderbolt, Ethernet, etc., to connect the system 1000 with another device, external component, or a network. Exemplary I/O devices and interfaces 1025 also include wireless transceivers, such as an IEEE 1002.11 transceiver, an infrared transceiver, a Bluetooth transceiver, a wireless cellular telephony transceiver (e.g., 2G, 3G, 4G), or another wireless protocol to connect the data processing system 1000 with another device, external component, or a network and receive stored instructions, data, tokens, etc. In some embodiments, these various components will be provided as a system on a chip (SoC). It will be appreciated that one or more buses may be used to interconnect the various components shown in FIG. 10.

For example, the data processing system 1000 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 1000 may be a network computer, server, network device, router, or an embedded processing device within another device or consumer electronic product. As used herein, the terms computer, system, device, processing device, and "apparatus comprising a processing device" may be used interchangeably with the term data processing system 1000 and include the above-listed exemplary embodiments.

It will be appreciated that additional components, not shown, may also be part of the system 1000, and, in certain embodiments, fewer components than that shown in FIG. 10 may also be used in a data processing system 1000. For example, in some embodiments where the data processing system 1000 is a router, the router may have one or more control cards configure routing in the network and one or more line cards to switch packets in a network based on the routing configuration from the control cards.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 1010 or other non-transitory machine-readable storage medium. The software may further be transmitted or received over a network (not shown) via a network and/or port interface 1015. In various embodiments, hardwired circuitry may be used in combination with the software instructions to implement the present embodiments. Thus, the techniques are not limited to any specific combination of hardware circuitry and software, or to any particular source for the instructions executed by the data processing system 1000.

An electronic device, such as the media devices, portable client devices, server computing devices, and/or content servers described herein, stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server end station coupled to one or more hosts for rebalancing one or more services running on the one or more hosts, the method comprising:
   receiving a rebalance request message;
   performing an iteration of a rebalancing computation by:
      selecting a set of one or more service sets for rebalancing, wherein each service set includes one or more services running on one of the one or more hosts, and wherein the selecting the set of one or more service sets is based on one or more service set constraints and one or more host constraints;
      generating one or more candidate solutions, wherein each of the one or more candidate solutions includes a randomized one-to-one mapping of each of the one or more service sets to one of the one or more hosts, and wherein the one or more generated candidate solutions adhere to the one or more service set constraints and the one or more host constraints;
      performing one or more crossover operations by randomly selecting a pair of candidate solutions from the one or more generated candidate solutions to generate additional candidate solutions;
      performing one or more mutation operations on the additional candidate solutions; and
      selecting as a solution, one of the one or more generated candidate solutions and the additional candidate solutions that has a best fitness score, wherein a fitness score for a candidate solution is calculated based on the distribution of resources resulting from and number of migrations needed for the candidate solution; and
   repeating the iteration of the rebalancing computation an additional number of times, wherein each time the selecting the set of one or more service sets is based on the mapping of the selected solution from the previous iteration; and
   migrating the one or more service sets to the one or more hosts based on the solution from a final rebalancing computation.

2. The method of claim 1, wherein the one or more service set constraints comprises one or more anti-affinity constraints, and wherein two service sets that have an anti-affinity constraint with each other cannot run on a same host.

3. The method of claim 1, wherein each service in each of the one or more service sets has an affinity constraint with at least one other service in the same service set, and wherein two services that have the affinity constraint with each other must run on the same host.

4. The method of claim 1, wherein the one or more host constraints comprise residual processor resources and residual memory resources, wherein a service set can only run on a host that has more residual processor resources than the service set requires and has more residual memory resources than the service set requires.

5. The method of claim 1, wherein the one or more mutation operations randomly change the one of the one or more hosts that is mapped to a service set in one more of the additional candidate solutions.

6. The method of claim 2, wherein the set of one or more service sets for rebalancing is one or more subsets of service sets running on one or more over-utilized hosts in the one or more hosts, wherein each subset is a predetermined fraction of the service sets of that host that have a least number of anti-affinity constraints and uses a least amount of processor and memory resources on their respective host.

7. The method of claim 2, wherein a split point for the one or more crossover operations splits each candidate solution in the selected pair of candidate solutions between those mappings in each candidate solution having service sets with anti-affinity constraints, and those mappings in each candidate solution having service sets with no anti-affinity constraints.

8. The method of claim 4, wherein the best fitness score for a candidate solution is a fitness score that, among the one or more candidate solutions, has the minimum amount of differences between the residual processor and residual memory among all the one or more hosts, and that has the minimum number of migrations needed to achieve the mapping in the candidate solution.

9. A server end station coupled to one or more hosts for rebalancing one or more services running on the one or more hosts, comprising:
   a processor and a memory, said memory containing instructions executable by the processor whereby the network controller is operative to:
   receive a rebalance request message;
   perform an iteration of a rebalance computation by:
      selecting a set of one or more service sets for rebalancing, wherein each service set includes one or more services running on one of the one or more hosts, and wherein the selecting the set of one or more service sets is based on one or more service set constraints and one or more host constraints;
      generating one or more candidate solutions, wherein each of the one or more candidate solutions includes a randomized one-to-one mapping of each of the one or more service sets to one of the one or more hosts, and wherein the one or more generated candidate solutions adhere to the one or more service set constraints and the one or more host constraints;
      performing one or more crossover operations by randomly selecting a pair of candidate solution from the one or more generated candidate solutions to generate additional candidate solutions;
      performing one or more mutation operations on the additional candidate solutions; and
      selecting as a solution, one of the one or more generated candidate solutions and the additional candidate solutions that has a best fitness score, wherein a fitness score for a candidate solution is calculated based on the distribution of resources resulting from and number of migrations needed for the candidate solution; and
   repeating the iteration of the rebalancing computation an additional number of times, wherein each time the selecting the set of one or more service sets is based on the mapping of the selected solution from the previous iteration; and
   migrating the one or more service sets to the one or more hosts based on the solution from a final rebalancing computation.

10. The server end station of claim 9, wherein the one or more service set constraints comprises one or more anti-affinity constraints, and wherein two service sets that have an anti-affinity constraint with each other cannot run on a same host.

11. The server end station of claim 9, wherein each service in each of the one or more service sets has an affinity constraint with at least one other service in the same service set, and wherein two services that have the affinity constraint with each other must run on the same host.

12. The server end station of claim 9, wherein the one or more host constraints comprise residual processor resources and residual memory resources, wherein a service set can only run on a host that has more residual processor resources than the service set requires and has more residual memory resources than the service set requires.

13. The server end station of claim 9, wherein the one or more mutation operations randomly change the one of the one or more hosts that is mapped to a service set in one more of the additional candidate solutions.

14. The server end station of claim 10, wherein the set of one or more service sets for rebalancing is one or more subsets of service sets running on one or more over-utilized hosts in the one or more hosts, wherein each subset is a predetermined fraction of the service sets of that host that have a least number of anti-affinity constraints and uses a least amount of processor and memory resources on their respective host.

15. The server end station of claim 10, wherein a split point for the one or more crossover operations splits each candidate solution in the selected pair of candidate solutions between those mappings in each candidate solution having service sets with anti-affinity constraints, and those mappings in each candidate solution having service sets with no anti-affinity constraints.

16. The server end station of claim 12, wherein the best fitness score for a candidate solution is a fitness score that, among the one or more candidate solutions, has the minimum amount of differences between the residual processor and residual memory among all the one or more hosts, and that has the minimum number of migrations needed to achieve the mapping in the candidate solution.

17. A non-transitory computer-readable storage medium having instructions stored therein, wherein the instructions, when executed by a processor of a server end station coupled to one or more hosts, cause the processor to perform operations for rebalancing one or more services running on the one or more hosts, the operations comprising:
  receiving a rebalance request message;
  performing an iteration of a rebalancing computation by:
    selecting a set of one or more service sets for rebalancing, wherein each service set includes one or more services running on one of the one or more hosts, and wherein the selecting the set of one or more service sets is based on one or more service set constraints and one or more host constraints;
    generating one or more candidate solutions, wherein each of the one or more candidate solutions includes a randomized one-to-one mapping of each of the selected one or more service sets to one of the one or more hosts, and wherein the one or more generated candidate solutions adhere to the one or more service set constraints and the one or more host constraints;
    performing one or more crossover operations by randomly selecting a pair of candidate solutions from the one or more generated candidate solutions to generate additional candidate solutions;
    performing one or more mutation operations on the additional candidate solutions; and
    selecting as a solution, one of the one or more generated candidate solutions and the additional candidate solutions that has a best fitness score, wherein a fitness score for a candidate solution is calculated based on the distribution of resources resulting from and number of migrations needed for the candidate solution; and
  repeating the iteration of the rebalancing computation an additional number of times, wherein each time the selecting the set of one or more service sets is based on the mapping of the selected solution from the previous iteration; and
  migrating the one or more service sets to the one or more hosts based on the solution from a final rebalancing computation.

18. The non-transitory computer-readable storage medium of claim 17, wherein the one or more service set constraints comprises one or more anti-affinity constraints, and wherein two service sets that have an anti-affinity constraint with each other cannot run on a same host.

19. The non-transitory computer-readable storage medium of claim 17, wherein each service in each of the one or more service sets has an affinity constraint with at least one other service in the same service set, and wherein two services that have the affinity constraint with each other must run on the same host.

20. The non-transitory computer-readable storage medium of claim 17, wherein the one or more host constraints comprise residual processor resources and residual memory resources, wherein a service set can only run on a host that has more residual processor resources than the service set requires and has more residual memory resources than the service set requires.

21. The non-transitory computer-readable storage medium of claim 17, wherein the one or more mutation operations randomly change the one of the one or more hosts that is mapped to a service set in one more of the additional candidate solutions.

22. The non-transitory computer-readable storage medium of claim 18, wherein the set of one or more service sets for rebalancing is one or more subsets of service sets running on one or more over-utilized hosts in the one or more hosts, wherein each subset is a predetermined fraction of the service sets of that host that have a least number of anti-affinity constraints and uses a least amount of processor and memory resources on their respective host.

23. The non-transitory computer-readable storage medium of claim 18, wherein a split point for the one or more crossover operations splits each candidate solution in the selected pair of candidate solutions between those mappings in each candidate solution having service sets with anti-affinity constraints, and those mappings in each candidate solution having service sets with no anti-affinity constraints.

24. The non-transitory computer-readable storage medium of claim 21, wherein the best fitness score for a candidate solution is a fitness score that, among the one or more candidate solutions, has the minimum amount of differences between the residual processor and residual memory among all the one or more hosts, and that has the minimum number of migrations needed to achieve the mapping in the candidate solution.

* * * * *